United States Patent [19]

Namikawa

[11] 3,803,634

[45] Apr. 9, 1974

[54] MAGNETIC PATTERN PRINTING METHOD

[75] Inventor: Mamoru Namikawa, Tokyo, Japan

[73] Assignee: Tokyo Magnetic Printing Company, Ltd., Taitoh-ku, Tokyo, Japan

[22] Filed: June 23, 1972

[21] Appl. No.: 265,466

[30] Foreign Application Priority Data

| | | |
|---|---|---|
| June 25, 1971 | Japan | 46-45608 |
| July 2, 1971 | Japan | 46-48555 |
| July 24, 1971 | Japan | 46-65758 |
| July 24, 1971 | Japan | 46-65759 |
| July 24, 1971 | Japan | 46-65760 |
| July 27, 1971 | Japan | 46-66701 |

[52] U.S. Cl.346/74 MP, 235/61.11 D, 235/61.12 M, 179/100.2 E

[51] Int. Cl. .......... G06k 7/00, G07b 1/00

[58] Field of Search .......... 235/61.11 D, 61.12 M; 346/74 MP; 179/100.2 E

[56] References Cited

UNITED STATES PATENTS

| | | | |
|---|---|---|---|
| 2,640,647 | 6/1953 | Rand, Jr. | 235/61.12 M |
| 2,914,746 | 11/1959 | James | 235/61.12 M |
| 3,573,436 | 4/1971 | Berler et al. | 235/61.12 M |
| 3,586,593 | 6/1971 | Dahl, Jr. | 235/61.12 M |
| 3,689,904 | 9/1972 | Butchington, Jr. | 340/174.1 R |
| 3,665,484 | 5/1972 | Foster | 235/61.12 M |

OTHER PUBLICATIONS

Barrett et al., "Magnetic Card Copier," IBM Technical Disclosure, Vol. 12, No. 12, May 1970.

DePew et al., "Magnetic Transfer Media," IBM Technical Disclosure, Vol. 10, No. 2, July 1967.

*Primary Examiner*—Paul J. Henon
*Assistant Examiner*—Michael Sachs
*Attorney, Agent, or Firm*—Staas, Halsey & Gable

[57] ABSTRACT

Apparatus and method for magnetic printing are described in which one or more perforations are formed in a base plate of a master magnetic medium for magnetic pattern printing, and one or more magnetizing elements formed illustratively of permanent magnets are disposed in the perforations with their end faces projecting a small distance from the surface of the base plate. The surface of a magnetic film of a slave magnetic medium for copying is contacted closely with the end faces of the magnetizing elements, and an external magnetic field is impressed to the contacted portions. The desired magnetic patterns are formed by the arrangement of the magnetizing elements or by the relative movement of said magnetizing elements with respect to the slave magnetic medium for copying; as a result, said magnetic patterns are copied on the magnetic film of the slave magnetic medium.

19 Claims, 30 Drawing Figures

MAGNETIC PATTERN PRINTING METHOD

BACKGROUND OF THE INVENTION

1. Field of the Invention

This invention relates to a method of magnetic pattern printing data onto magnetic storage cards or the like for labor-saving purposes.

2. Description of the Prior Art

A magnetic medium for providing a reproducible magnetic record is widely used as an internal or external memory for storage and transmission of analog or digital signal information. In recent years, such magnetic media have been employed as bank cards, identification cards, magnetic commutation tickets, magnetic passenger tickets or the like, especially for labor-saving purposes.

With these cards and tickets, digital signals are written by a recording head of an encoder and the records are electromagnetically read out by a reader. Conventional types of the prior art encoders employ a magnetic head, which require precision working and a multi-stage amplifier for applying a signal current thereto, and require high-cost construction for reliability and stability in operation.

FIG. 1 shows one example of a magnetic record pattern recorded upon a magnetic commutation ticket. Namely, the magnetic surface of the magnetic commutation ticket has recorded thereon a direction discerning code (the read-out direction), and specified date, railway section, order of stations and so on in such a signal arrangement as indicated by A in FIG. 1. For this recording, magnetic recording systems such as BR (bias-to-return), NRZ (non-return-to-zero) and PM (phase modulation) methods, as well as other magnetic recording methods, are usable; however, a magentic saturation recording method is usually employed. In this latter case, the information recording density is usually 1 to 3 BPM (bits per millimeter), which is very low as compared with the information recording density of a conventional magentic tape for use with computers.

The magnetic commutation ticket may also be recorded with an information recording density similar to the aforementioned density, but a magnetic recording method therefor employs a conventional combination of a precision magnetic head with an electromagnetic circuit as above described and is extremely expensive. The magnetic passenger ticket, which is thrown away after being used only once, is also used with an encoder substantially the same as that for the magnetic commutation ticket in order to encode signals of rough or low density recorded on the magnetic passenger ticket. The relatively high costs of such recording has retarded the wide use of this system, although this system has been judged useful. Indicia have been printed on the surface of the magnetic passenger ticket by ordinary printing and back thereof has been coated with a magnetic layer. The magnetic passenger ticket is encoded by an automatic ticket booking machine and when the ticket is put in an automatic ticket examining machine, a gate is opened to admit a passenger into the station precincts. Then, when the passenger has reached his destination and puts the ticket in an automatic ticket examining and collecting machine, if the date and the signal of the destination recorded on the ticket are verified, the gate is opened to admit the passenger to exit the station.

Recently, there has been a trend of replacing this ticket examining system with the following system which does not require magnetic read-out of the used ticket, to curtail the involved costs. Namely, the magnetic passenger ticket sold by the automatic ticket booking machine has magnetically recorded thereon signals such as a date, an initial station, etc., and unknown signals peculiar to each station are printed on the surface of the ticket as usual. At the automatic ticket examining gate of the starting station, the aforementioned magnetic signals are read out and, if they are correct, the gate is opened and, at the same time, all the magnetic signals are erased, by which the magnetic ticket cannot be used again for taking a train. At the destination station, the matters printed on the surface of the ticket are checked by a ticket examiner and, if they are verified as correct, the passenger is allowed to pass the ticket gate.

Briefly stated, saving of labor by this system lies in the fact that the passenger enters the station through an unattended ticket gate and exits the station through an attended ticket gate. With this system, labor can be reduced by half as compared with that required in the present system, requiring an attendant at each of the entrance and exit stations. Such laborsaving systems have all been proposed from an economical point of view for curtailment of costs.

FIG. 2 is a cross-sectional view for explaining a conventional isothermal magnetic contact printing system. Reference numeral 1 indicates generally a master magnetic medium for magnetic pattern printing which has recorded thereon magnetic signals, numeral 2 identifies its base plate and numeral 3 represents its magnetic film on which the magnetic signals have been recorded. Reference numeral 4 designates generally a slave magnetic medium for copying, numeral 5 refers to its base plate and numeral 6 identifies its magnetic film.

The master magnetic medium 1 for magnetic pattern printing is placed on the slave magnetic medium 4 for copying while their magnetic magnetic films 3 and 6 are held in close contact with each other, being pressed in directions of arrows 7 and 8, and are fixed together so as not to move relative to each other; the assembly thus formed may be moved in a direction of an arrow 9.

At this time, an external magnetic field is applied to the assembly by means of an electromagnet comprising a magnetic core 10 and a winding 11, by which the magnetic signals recorded on the master magnetic medium 1 are copied on the slave magnetic medium 4.

However, this method employs a conventional precision magnetic head and an electromagnetic amplifier for recording the magnetic signals on the master magnetic medium. When this method is used with the magnetic passenger ticket, an expensive apparatus must be employed, to raise the cost of the apparatus and to require close maintenance of the apparatus.

The transfer of audible range signals from a master to a slave medium in a manner similar to that used by the method and apparatus of this invention is described in an article entitled, "Magnetic Printing of Audible Range Signals," appearing in the *Journal of the Society of Electricity of Japan*, in November of of 1961, which describes in some detail the basic phenomena by which the data is written upon the slave medium.

SUMMARY OF THE INVENTION

Therefore, it is a desired object to provide an encoding system which is simple, inexpensive and reliable as compared with the conventional encoding system.

Another object of this invention is to provide a magnetic pattern printing method which is capable of stably and positively copying magnetic information by the use of a simple device.

Still another object of this invention is to provide a master magnetic medium for magnetic pattern printing for use in the abovementioned magnetic pattern printing method and magnetizing elements which are principal components of the master magnetic medium.

In accordance with this invention, there is taught a method of magnetic printing in which a magnetizing element or elements formed with a permanent magnet or magnets are disposed in one or more perforations formed through a base plate of a master magnetic medium, by which desired magnetic patterns are concurrently or sequentially formed with the end faces of the magnetizing elements. The surface of a magnetic film of a slave or copy magnetic medium is closely contacted with the end faces of the magnetizing elements of the master magnetic medium. Then, an external magnetic field is impressed to the contacted portions to print the magnetic patterns on the slave magnetic medium.

BRIEF DESCRIPTION OF THE DRAWINGS

This invention will be more fully understood from the following description and attached drawings, in which.

DESCRIPTION OF THE PREFERRED EMBODIMENTS

Figures 1, 2, 3A, 3B:
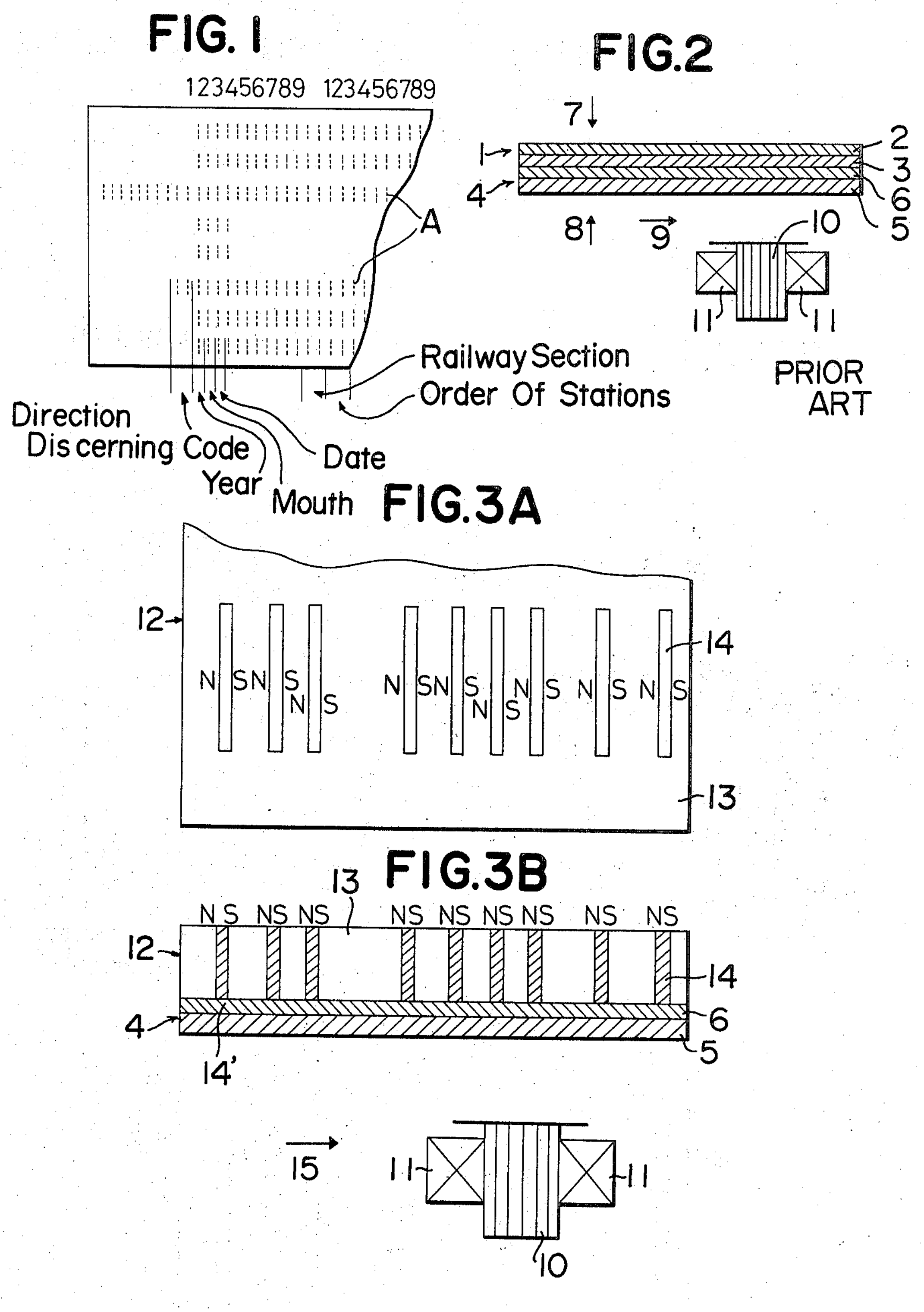
FIG. 1 shows one example of magnetic patterns recorded on a magnetic railway ticket.
FIG. 2 is a diagram for explaining an isothermal magnetic contact printing method heretofore employed.
FIGS. 3A and 3B respectively show a top view of a master magnetic medium and a cross-sectional view of such a master magnetic medium for printing magnetically a copy medium, in accordance with the principles of this invention.

With reference to the drawings, this invention will hereinafter be described as being applied to a magnetic railway ticket. FIGS. 3A and 3B are diagrams explaining the principles of this invention. A master magnetic medium 12 for magnetic pattern printing is placed in close contact with a magnetic film 6 of unrecorded magnetic railway ticket 4.

The master magnetic medium 12 has mounted in its nonmagnetic member 13 thin plate-like permanent magnets 14 which are magnetized with magnetic poles N and S at both sides of their lower end portions and arranged to provide a required magnetic pattern as shown in FIGS. 3A and 3B.

The master magnetic medium 12 and the magnetic railway ticket 4 are held in close contact with each other and moved in a direction of an arrow 15, and an external magnetic field is applied to them by an electromagnet 10 disposed thereunder. Thus, the magnetic pattern formed by the permanent magnets 14 (hereinafter referred to as magnetizing elements) arranged in the master magnetic medium 12 is copied on the magnetic film 6 of the unrecorded magnetic ticket 4.

At the time of impression of the external magnetic field, the electromagnet 10 may be moved, or both the master magnetic medium 12 for magnetic pattern printing and the slave magnetic medium for copying may be moved while being held in close contact with each other. Further, it is also possible to impress the magnetic field upon the master magnetic medium 12 and the magnetic ticket 4 by an electromagnetic force covering the entire area of the latter, with the master magnetic medium, the magnetic ticket and the impressing means being all fixed. In an illustrative example, the intensity of the external magnetic field is 300 to 400 gausses at the contact area of the master magnetic medium 12 with the slave magnetic medium 4.

Illustratively, the magnetizing elements 14 may be a magnet of the ferrite series such as barium ferrite, strontium ferrite or the like, a precipitation hardening permanent alloy magnet, a permanent magnet such as Alnico V or Cunife, a lattice transformation hardened permanent alloy magnet, a permanent magnet such as KS steel or MT steel, or other suitable permanent magnets. The magnetic field intensity at the end face 14' of the magnetizing element 14 is usually illustratively selected to be about 190 to 400 gausses and sufficient to be several tens of gausses for practical use.

The coercive force of the magnetizing element 14 is dependent upon the magnetic material used for the magnetic railway ticket. A magnetizing element having a coercive force exceeding 300 oersteds may be used with a conventional magnetic recording medium formed of $\gamma$—$Fe_2O_3$. A magnetic powder for the magnetic ticket is typically $\gamma$—$Fe_2O_3$ and its coercive force Hc is 230 to 300 oersteds. The thickness of the magnetic film 6 is typically 8 to 20 microns and its residual flux $\phi r$ is more than 1.0.

In the foregoing magnetic printing, the master magnetic medium 12 and the magnetic film 6 of the magnetic ticket 4 are closely contacted with each other. Even if the paper 5 of the magnetic ticket 4 and the master magnetic medium 12 are closely contacted with each other, recording of about 1 BPM (1 bit per millimeter on the surface of the magnetic film) is readily possible.

Figures 4, 5, 6, 7, 8, 9, 10, 11, 12:
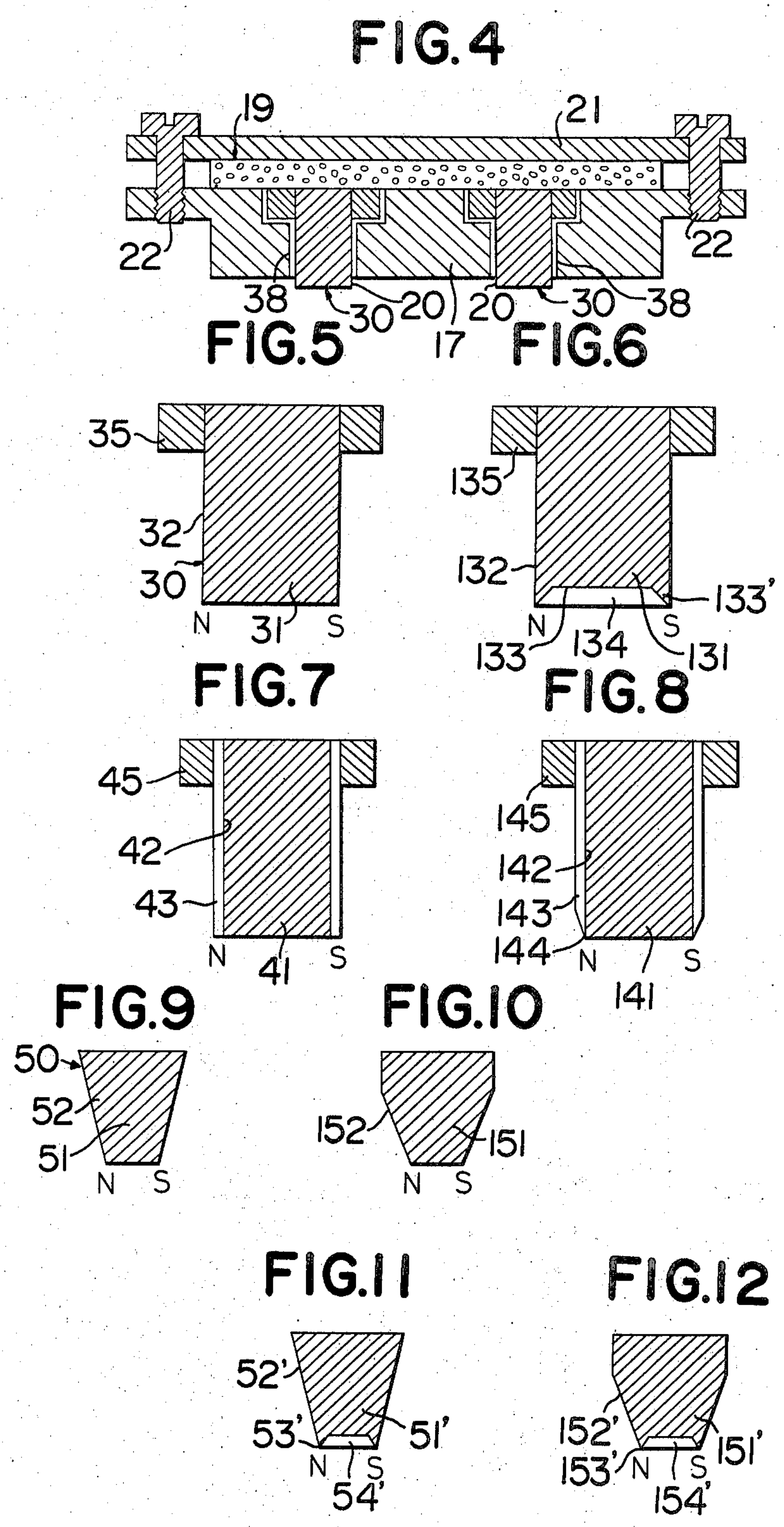
FIG. 4 is a cross-sectional view illustrating one example of a master magnetic medium for magnetic pattern printing employed in this invention.
FIGS. 5 to 8 are cross-sectional views showing examples of plate-like magnetizing elements with or without a side layer, which are mounted in the master magnetic medium for magnetic pattern printing.
FIGS. 9 to 12 show examples of magnetizing elements in which at least one portion of the plate-like member of each of them is tapered.

FIG. 4 is a cross-sectional view showing the construction of one example of the master magnetic medium for magnetic pattern printing in which a plurality of magnetizing elements are arranged to form a desired magnetic pattern. The magnetizing elements, indicated by the numeral 30, are illustratively thin plate-like members formed of, for example, ferrite, 0.3 mm in thickness, 5 mm in length and 10 mm in height. They are mounted in a fixture plate 17 in such a manner as to be movable in a lateral direction. The spacings of the magnetizing elements 30 can be altered freely by changing the positions of stepped perforations 38 formed in the fixture plate 17, to thereby obtain a desired magnetic pattern. The magnetizing elements 30 mounted in the fixture plate 17 are pressed by an elastic plate 19 such as a sponge plate or an elastic member such as a spring board to cause the end faces of the magnetizing elements 30 to project a small distance from the lower surface of the fixture plate 17, providing projecting portions 20.

A press plate 21 is mounted on the upper surface of the elastic plate 19. The press plate 21 and the fixture plate 17 are clamped with screws 22 to fix the magnetizing elements 30 in position. The magnetizing elements 30 shown in FIG. 4 are of the simplest construction. Namely, the magnetizing elements 30 are such as shown in FIG. 5, in which a fixing part 35 is provided on a permanent magnet 31 having vertical sides 32 and the magnet 31 is magnetized with magnetic poles N and S in such a manner that magnetization may be achieved in a selected direction to form the desired magnetic pattern at the end face. The fixing part 35 is important for positioning the magnetizing element 30 as in FIG. 4.

FIG. 6 shows another example of the magnetizing element in which a recess is formed in the end face of a permanent magnet 131 centrally thereof to make the end face V- or U-shaped in section as indicated by 133 in an attempt to provide for enhanced magnetic field intensity of the magnetic poles N and S. Reference numeral 134 indicates a non-magnetic material which prevents a marginal portion 133′ of the permanent magnet 131 from coming off.

FIGS. 7 and 8 illustrate other examples of the magnetizing element in each of which the permanent magnet has a fixing part and side layers of a high-permeability material formed on both the vertical sides in close contact therewith to provide for increased mechanical strength and for magnetic flux concentration at both edges. In FIG. 7, reference numeral 41 indicates the permanent magnet, numeral 45 identifies the fixing part, and numeral 43 refers to the layers of high-permeability material. In the present example, the layers 43 are formed about 50 microns in thickness by plating with permalloy and their lower end portions are magnetized with magnetic poles N and S as illustrated. The fixing part 45 plays an important role in positioning the magnetizing element when it is mounted in the base plate 17 as is the case with the fixing part 35 in the example of FIG. 4. Also in the example of FIG. 8, permalloy is used as the high-permeability material and the lower edges of the side layers are tapered acutely as indicated by surfaces 144 for magnetic flux concentration.

FIGS. 9 and 10 illustrate magnetizing elements formed with permanent magnets which have tapered portions. With the provision of the tapered portions, the magnetizing element can be easily mounted and fixed in the master magnetic medium for magnetic pattern printing. Namely, the construction of the magnetizing element is made more practical. In FIGS. 9 and 10, respectively, reference numerals 51 and 151 indicate the permanent magnets and numerals 52 and 152 refer to the tapered surfaces. The tapered lower end portions are magnetized with magnetic poles N and S, respectively.

FIGS. 11 and 12 show modified forms of the magnetizing elements, in which the end face of a permanent magnet 51′ (and 151′) is formed V- or U-shaped in section, as indicated by 53′ (and 153′), to provide for enhanced magnetic field intensity. Reference numeral 54′ (and 154′) indicates a non-magnetic material, which prevents the marginal edge 53′ (and 153′) of the permanent magnet 51′ (and 151′) from coming off.

Figure 13:
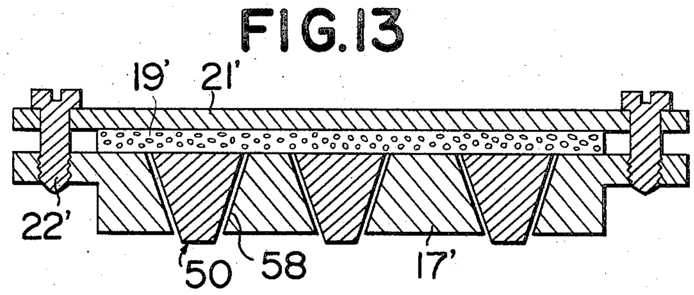
FIG. 13 illustrates one example of the master magnetic medium for magnetic pattern printing which has mounted therein the magnetizing element of FIG. 9.

FIG. 13 illustrates in section the construction of a master magnetic medium for magnetic pattern printing in which a plurality of magnetizing elements of FIG. 9 are arranged to provide a desired magnetic pattern. The magnetizing elements, indicated by 50, are mounted in a fixture base plate 17′ in a manner to be movable in a vertical direction, but not to move in a lateral direction. The spacings of the magnetizing elements 50 can be freely selected by changing the positions of tapered holes 58 bored in the plate 17′, so that a desired magnetic pattern can be obtained at will. The remaining construction of this example is similar to that of the example of FIG. 4. The embodiment of FIG. 13 has been described to employ the magnetizing element of FIG. 9, but the elements of FIGS. 10 to 12 can also be employed in exactly the same manner.

Figure 14:
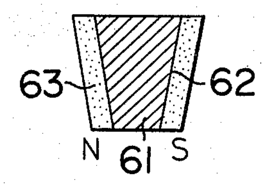
FIGS. 14 to 17 show examples of magnetizing elements in which the tapered portion is covered with a side layer.
Figure 15:
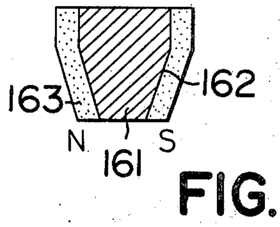

FIGS. 14 and 15 show modified forms of the magnetizing elements of FIGS. 9 and 10 in which layers of a high-permeability material are formed about 50 microns thick by plating permalloy on both tapered sides of the permanent magnet. In FIGS. 14 and 15, respectively, reference numerals 61 and 161 indicate the permanent magnet, numerals 62 and 162 refer to the tapered portions, the numerals 63 and 163 represent the high-permeability material layers. The permanent magnet is magnetized as illustrated.

Figure 16:
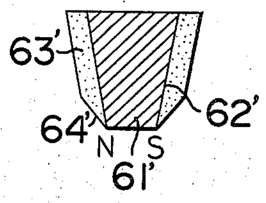
Figure 17:
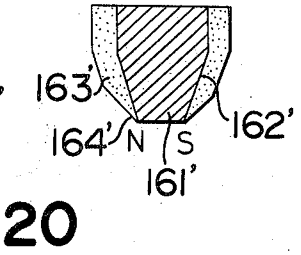

In FIGS. 16 and 17, respectively, the lower end portions of the layers 63′ and 163′ of the magnetizing elements of FIGS. 14 and 15 are tapered acutely as indicated by surfaces 64′ and 164′ to provide for enhanced magnetic field intensity.

Although FIGS. 4 and 13 illustrate the examples using a plurality of magnetizing elements, it is possible to practice this invention even without employing such a plurality of magnetizing elements. Namely, a single magnetizing element is contacted with the magnetic film of the slave magnetic medium for copying, an external magnetic field covering that area is applied and then the magnetizing element is pressed against the slave magnetic medium for copying at another position. Thus, such an operation is repeatedly achieved as is the case with a typewriter, thereby to provide a desired magnetic pattern. In this manner, a single magnetizing element is moved in a vertical direction to be brought into or out of close contact with the magnetic film of the slave magnetic medium for copying and the external magnetic field is applied only when they are held in close contact with each other, thereby forming a magnetic pattern. In the case of using a single magnetizing element, it is possible to mount an external magnetic field for impressing coil 73 around the magnetizing element as depicted in FIG. 18.

Figure 18:
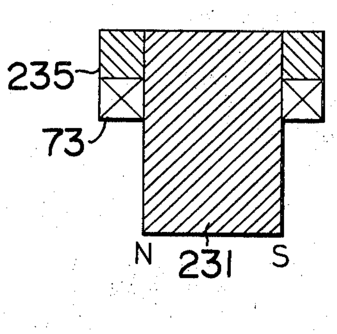
FIGS. 18 to 21 show examples of the magnetizing elements of FIGS. 5 to 8, respectively, which have wound thereon coils for impression of external magnetic field thereto.
Figure 19:
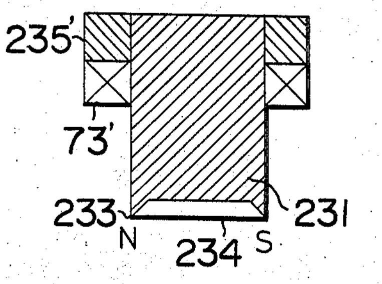
Figure 20:
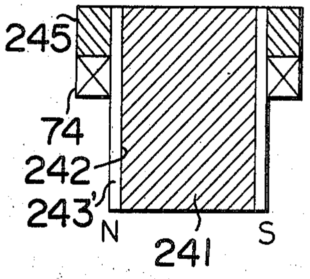
Figure 21:
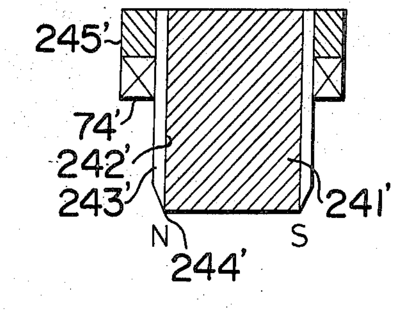
Figure 22:
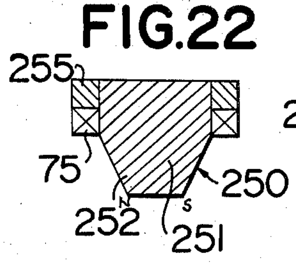
FIGS. 22 to 25 similarly show examples of the magnetizing elements of FIGS. 10, 12, 14 and 15, respectively, which have mounted thereon fixing parts and wound thereon coils for impression of external magnetic field thereto.
Figure 23:
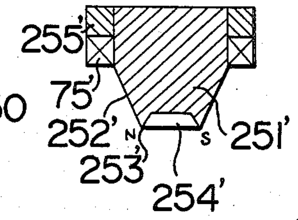
Figure 24:
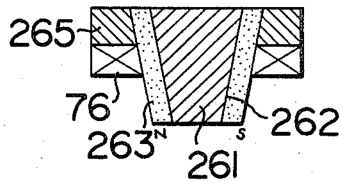
Figure 25:
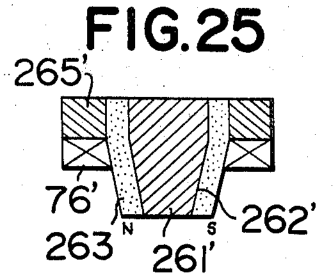

A coil similar to that shown in FIG. 18 may also be mounted on magnetizing elements depicted in FIGS. 19 to 21 or those of other shapes and constructions such as shown in FIGS. 22 and 25 and these magnetizing elements can be used in the same manner as that of FIG. 18. With the magnetizing element illustrated in FIG. 18, the magnetic pattern can be formed only by switching on and off a current of the external magnetic field impressing coil 73 without providing an external magnetic field impressing device such as described in connection with FIG. 3 which comprises the magnetic core 10 and the coil 11. For example, by applying an AC current of about 1mA to the coil 73 formed by winding 400 turns of wire having a diameter of 0.02$\phi$, an external magnetic field of the aforesaid intensity necessary for copying can be provided.

Figure 26:
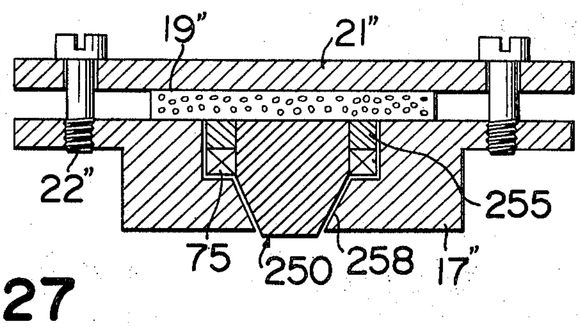
FIG. 26 shows one example of the master magnetic medium which has mounted therein the magnetizing element of FIG. 25.

In FIG. 26, a tapered magnetizing element 250 of the type shown in FIG. 22, which has a coil 75 disposed under the fixing part 255 thereof, is inserted into a tapered hole 258 formed in a base plate 17'' of a master magnetic medium as described above. The master magnetic medium for magnetic pattern printing and the slave magnetic medium for copying are adapted to be movable in the column and/or the row direction relative to each other, and a current is applied to the coil 75 to impress the external magnetic field to them only when they are held in close contact with each other at a recording position for forming a desired magnetic pattern, thereby copying the desired magnetic pattern on the slave magnetic medium.

Figures 27, 28A, 28B:
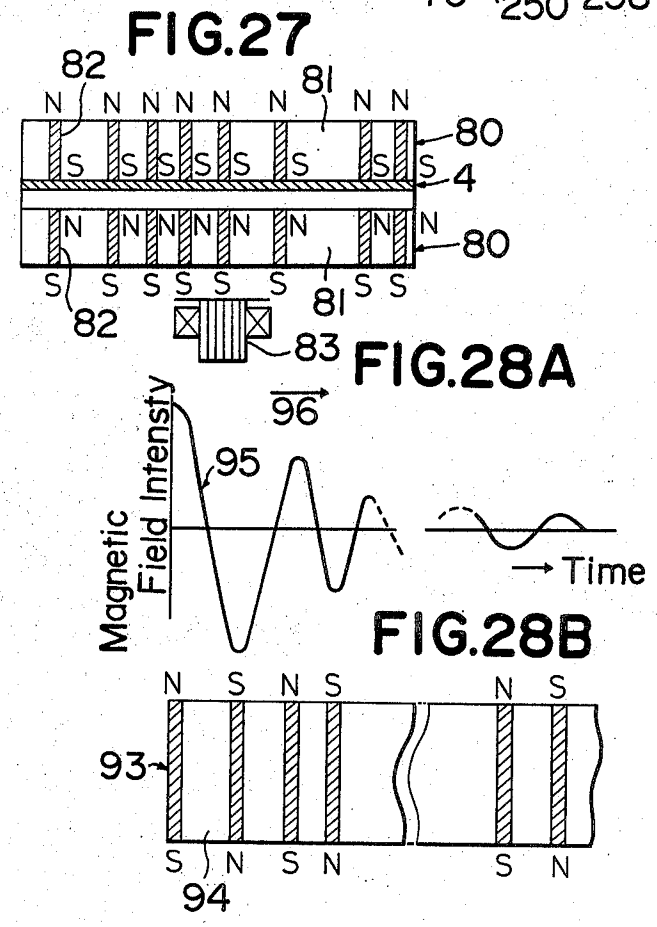
FIG. 27 illustrates another example of this invention in which the master magnetic medium is disposed on both the surface and underside of the slave magnetic medium for copying.
FIGS. 28A and 28B show respectively a graph of a magnetic field and an assembly of permanent magnets for forming this field.

FIG. 27 is a cross-sectional view for explaining another example of this invention. Master magnetic media 80 for magnetic pattern printing are disposed on both sides of the slave magnetic medium for copying. In each of the master magnetic media 80, magnetizing elements 82 are located at desired positions in a non-magnetic base 81 to form a desired magnetic pattern of the same arrangement. As shown in FIG. 27, the slave magnetic medium 4 is held between two master magnetic media 80 with their magnetic poles in opposing relation to each other and an external alternating magnetic field is impressed by electromagnet 83 from above or from beneath, acting between the magnetic poles to form the magnetic pattern on the slave magnetic medium for copying.

In the prior art, the external magnetic field is produced by an AC current of a commercial (50 or 60 Hz/S) or higher frequency, but the external magnetic field may be an alternating magnetic field which is generated by permanent magnets as shown in FIG. 28B. Namely, the permanent magnets 93 and non-magnetic members 94 are alternately arranged, and the magnetic field intensities at the upper end faces of the permanent magnets are held different from one another to provide an alternating magnetic field 95 which is gradually attenuated as illustrated in FIG. 28A. To this end, the magnetic intensities of the permanent magnets are selected different from one another or the distance between the slave magnetic medium and the master medium is altered. Even where the alternating magnetic field 95 is held unchanged and the slave magnetic medium 4 and the master medium 12 are held in close contact with each other and are passed through the alternating magnetic field from a maximum point of the magnetic field intensity to a point of zero intensity in a direction of an arrow 86, a magnetic pattern can be copied on the slave magnetic medium. In the foregoing examples, the magnetizing elements are described to be plate-like, but circular or square magnetizing elements provide the same effects as those obtainable with the plate-like ones.

As has been described in the foregoing, this invention provides an easy and precise magnetic pattern printing method which employs a master magnetic medium for magnetic pattern printing of extremely simple construction. This invention has particular utility when employed for labor-saving and rationalization by digital signal recording, and hence is applicable in many industrial fields.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A method of magnetically writing information stored upon a master magnetic medium comprising a support member having at least one opening therein for receiving at least one magnetic element, upon a slave medium of a magnetic material, said slave medium comprising a magnetic recording surface, said method comprising the steps of:

a. disposing a selected number of magnetic elements in a selected configuration within the opening(s) of the support member to establish the desired magnetic pattern;

b. disposing the magnetic recording surface of the slave magnetic medium in intimate contact with the end face of the selected magnetic element(s); and c. applying an external magnetic field to the slave magnetic medium surface contacted by the selected magnetic elements whereby the writing of the desired magnetic pattern upon the slave magnetic medium is effected.

2. The method as claimed in claim 1, wherein the desired magnetic pattern is formed by disposing a plurality of magnetic elements within the openings of the support member in a configuration of columns and rows.

3. The method as claimed in claim 1, wherein a single magnetic element is inserted sequentially into selected ones of a plurality of openings formed in the support member, to thereby establish the desired magnetic pattern, upon each insertion of the single magnetic element, the writing of informatoin upon a slave magnetic medium is effected.

4. The method as claimed in claim 1, wherein the slave magnetic medium and the master magnetic medium are moved with respect to each other, whereby the end face of the selected magnetic element(s) is disposed in intimate contact with the magnetic recording surface at a plurality of positions oriented in rows and columns, and the external magnetic field is applied to the contacted surface only when the magnetic element(s) and the magnetic recording surface are in contact with each other at a recording position for forming a desired magnetic pattern.

5. A method as claimed in claim 1, wherein two of said master magnetic media are provided, and the number and configuration of the magnetic elements of the two magnetic media are selected to establish a magnetic pattern with opposing magnetic poles having opposite polarities, the first and second magnetic media are disposed on both sides of the slave magnetic medium so that the desired magnetic pattern of each of the first and second master magnetic media is disposed in registration with the other and the magnetic poles of the opposing end faces of the magnetic elements are made opposite in polarity and an external magnetic field is impressed to the slave magnetic medium and at least one of the master magnetic media.

6. A master magnetic medium for establishing a desired magnetic pattern to be reproduced onto a slave magnetic medium by the application of an external magnetic field, comprising:

a. a plurality of magnetic elements, each having a mounting portion;

b. a support plate having a plurality of openings therein for receiving the magnetic elements, said openings disposed in a configuration to establish the desired magnetic pattern; and c. means disposed for flexibly holding said mounting portions of each of said magnetic elements against said support plate to securely position said magnetic elements with respect to said support plate.

7. A master magnetic medium as claimed in claim 6, wherein each of said magnetic elements comprises a permanent magnet, and said openings are disposed in columns and rows for receiving said permanent magnets.

8. A master magnetic medium as claimed in claim 6, wherein there is included means for readily removing single magnetic elements from said support plate.

9. Apparatus for printing the magnetic pattern emanating from said master magnetic medium as claimed in claim 6, wherein there is further included means for moving said master magnetic medium to a plurality of successive positions disposed in rows and columns with respect to a slave magnetic medium.

10. A master magnetic medium as claimed in claim 6, wherein each of said magnetic elements comprises a plate-like permanent magnet.

11. A master magnetic medium as claimed in claim 6, wherein each of said magnetic elements comprises a tubular permanent magnet of extended axial length.

12. A master magnetic medium as claimed in claim 11, wherein each of said tubular magnetic elements of extended axial length includes an end face having a centrally disposed recess therein and a marginal edge portion extending about said recess and having a surface which is tapered to form an acute angle with respect to said end face.

13. A master magnetic medium as claimed in claim 6, wherein each of said magnetic elements includes first and second side plates comprised of a magnetic material of high permeability, said first and second side plates being disposed in intimate contact with the surfaces of the lateral sides of said magnetic element.

14. A master magnetic medium as claimed in claim 13, wherein each of said first and second side plates includes a marginal edge surface disposed about an end face of said magnetic element and at an acute angle with respect to an end face of said magnetic element.

15. A master magnetic medium as claimed in claim 6, wherein each of said magnetic elements has at least one extended side surface tapered with respect to an end face thereof.

16. A master magnetic medium as claimed in claim 15, wherein said end face of each of said magnetic elements has a centrally recessed portion and has a marginal edge formed about said recess, said marginal edge having a surface disposed at an acute angle with respect to said end face.

17. A master magnetic medium as claimed in claim 6, wherein each of said magnetic elements includes a side surface tapered with respect to an end face thereof and includes a layer of high-permeability material disposed in intimate contact with at least a portion of said tapered side surface.

18. A master magnetic medium as claimed in claim 17, wherein said layer of high-permeability material includes a marginal, end surface which is disposed at an acute angle with respect to said end face.

19. A master magnetic medium as claimed in claim 6, wherein each said magnetic element(s) includes an energizeable coil disposed thereabout for providing an external field therethrough.

* * * * *

UNITED STATES PATENT OFFICE
CERTIFICATE OF CORRECTION

Patent No. 3,803,634 Dated April 9, 1974

Inventor(s) Mamoru Namikawa

It is certified that error appears in the above-identified patent and that said Letters Patent are hereby corrected as shown below:

In the illustration appearing at the bottom of page 1, change "Mouth" to --Month--.

In Figure 1, sheet 1 of the drawings, change "Mouth" to --Month--.

Signed and sealed this 17th day of December 1974.

(SEAL)
Attest:

McCOY M. GIBSON JR.
Attesting Officer

C. MARSHALL DANN
Commissioner of Patents